Aug. 21, 1962   D. R. GREER   3,049,830
FISH LURES
Filed April 3, 1961

United States Patent Office 3,049,830
Patented Aug. 21, 1962

---

3,049,830
FISH LURES
Douglas R. Greer, 9 Jasper Ave., Toronto 9,
Ontario, Canada
Filed Apr. 3, 1961, Ser. No. 100,425
3 Claims. (Cl. 43—42.34)

My invention relates to an artificial fish lure and more particularly to an artificial fish lure bearing a novel and realistic overlapping scale simulation of natural size, the objects, advantages and distinguishing features of which will appear as the description proceeds.

With reference to the accompanying drawing which forms a part of this specification, longitudinal lines are drawn from left to right or vice versa and transverse lines are drawn from top to bottom or vice versa. The drawing is a four times magnification of a successfully tested prototype in which.

Figures 6, 7, 8:
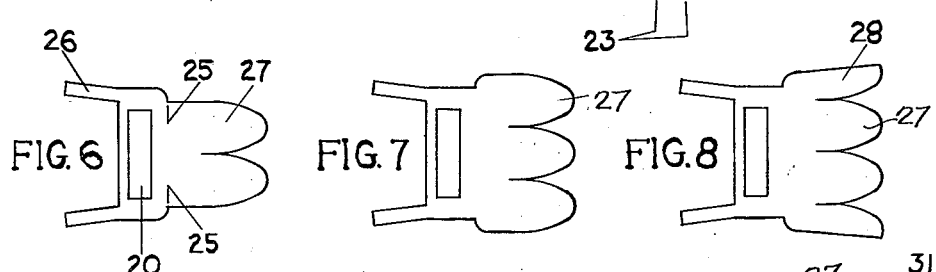

FIGURES 6, 7, and 8 are plan views of the blanks which are subsequently formed to constitute the transverse elements of the lure. The blanks for the remaining transverse elements are exact replicas of FIGURES 6, 7, and 8.

Figures 9, 10:
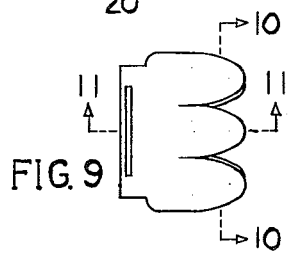

FIGURE 9 is a plan view of a modified transverse element, each of the three scales thereon possessing a slight convexness which moderates the light refraction under certain weather conditions, and with that surface on which the scales are apparent, formed into an arc simulating anatomical conformation, the highest level of the arc lying directly over and parallel to the longitudinal centre-line of the element.

FIGURE 10 is a cross-section on the line 10—10 of FIGURE 9.

Figure 11:

FIGURE 11 is a section on the longitudinal centre-line 11—11 of FIGURE 9.

Figure 12:
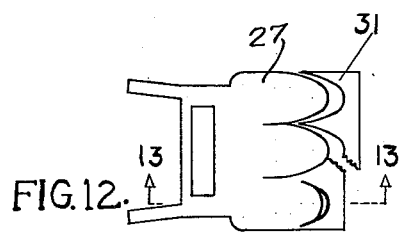

FIGURE 12 is a plan view of the blank shown in FIGURE 7, illustrating the process by which the scale contours are cut.

Figure 13:
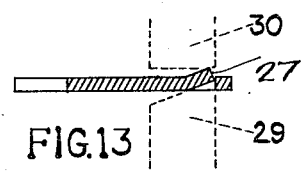

FIGURE 13 is a section on the line 13—13 of FIGURE 12, broken scrap portion 31 of FIGURE 12, not included.

The construction of my invention prescribes the following procedure.

FIGURES 1 to 4 inclusive, illustrate an assembly comprising ten elements, the blanks for said elements being stamped from thin metal and itemized as follows:
One required as per FIGURE 5.
Two required as per FIGURE 6.
Four required as per FIGURE 7.
Three required as per FIGURE 8.

Figure 5:
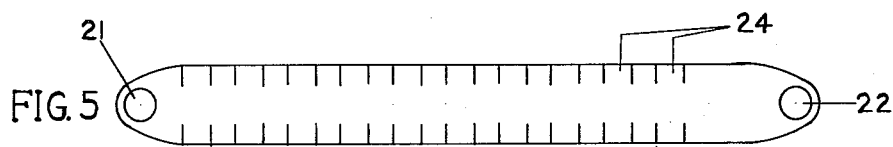
FIGURE 5 is a plan view of the blank which is subsequently formed to constitute the longitudinal mounting element which receives and secures the remaining elements of the lure.

FIGURE 5 shows a strip of metal of suitable length and rectangular cross-section, the length and width of said rectangular cross-section being slightly less than the length and width of rectangular hole 20 which is shown on FIGURES 6, 7 and 8. FIGURE 5 also shows a round hole 21 at the forward end of the blank which provides for attachment of a fishing line, and a round hole 22 at the rearward end which provides for attachment of a fish hook, said ends being shaped to a contour resembling a semi-ellipse, this contour complementing the general appearance and function of the lure. Directly opposite each other along the longitudinal edges of the blank, FIGURE 5, are shown forty unevenly, but symmetrically spaced, identical lancings 23 which sever the blank for approximately one-quarter its width beginning at, and disposed at right angles to, said longitudinal edges. Those portions of the blank, FIGURE 5, which are longitudinally isolated by the first and second most rearwardly pairs of opposite lancings 23 shall be hereinafter referred to as the tabs 24, the next pair of tabs 24 appearing between the third and fourth most rearwardly pairs of opposite lancings 23, the next pair of tabs 24 appearing between the fifth and sixth most rearwardly pairs of opposite lancings 23, et cetera. The forty aforementioned lancings 23 along the longitudinal edges of the blank, FIGURE 5, provide for a total of twenty evenly spaced tabs 24 directly opposite each other, the longitudinal dimension of tab 24 being slightly greater than the longitudinal space between the tabs 24.

FIGURE 6 shows a blank stamped from thin metal, which, for the purpose of clearer comprehension, can be hypothetically divided into two significant areas, said hypothetical division being a transverse, straight line between the junctions 25 which are created by the transverse discontinuance of the small radii and the relatively straight, outer longitudinal edges of the blank. The previously described rectangular hole 20, the long dimension of which is equally disposed about and at right-angles to the longitudinal centre-line of the blank, is shown in the area forward from said hypothetical division, said forward area having as its most forwardly and outermost attributes, two prong-like projections, outwardly disposed from the longitudinal centre-line of the blank, approximately seven degrees, said prong-like projections being hereinafter referred to as the legs 26. The area rearward from the aforementioned hypothetical division, has two identical rearward projections, the contours of each said projection resembling a semi-ellipse, the small radius of said semi-ellipse being the most rearward extremity. The longitudinal and transverse dimensions of said semi-ellipse are approximately equal and the aforementioned projections assuming this contour are, at their infinitesimal junction created by the tangency of the semi-elliptical curves, precisely adjacent, but completely severed from each other, the severance continuing past the junction as a straight line in a forwardly direction for a relatively short distance on the longitudinal centre-line of the blank. The aforementioned semi-elliptical projections will be hereinafter referred to as the scales 27.

FIGURE 7 shows a blank stamped from thin metal, the description of which is exactly the same as that of FIGURE 6, excepting that there are three scales 27 shown on FIGURE 7, the longitudinal centre-line of the middle scale 27 occurring on the longitudinal centre-line of the blank.

FIGURE 8 shows a blank stamped from thin metal, the description of which is exactly the same as that of FIGURE 6, excepting the addition of the two incomplete scales 28, the straight edges of which are outwardly disposed from the longitudinal centre-line of the blank approximately six degrees, the rearward extreme of said straight edges constituting the outermost transverse extremities of the blank.

FIGURES 12 and 13 illustrate the essence of the stamping process employed to cut the contour of the scales 27. Lancing punch 29 which is shown in phantom outline in FIGURE 13 is of a cross-section which is exactly the same as middle scale 27, FIGURE 12, said cross-section being completed by a transverse straight line between the most forwardly extremities of the severance which constitutes the contour of the middle scale 27, FIGURE 12. Thus, the line completing the cross-section of lancing punch 29 is forward from the infinitesimal junction of the scales 27, the aforementioned relatively short distance. The angular cutting face of lancing punch 29 is disposed to the plane in which the blank is stamped from the parent sheet metal, approximately twenty degrees, the uppermost point of said angular cutting face being at the rearward extremity of scale 27. Pressure pad 30, also shown in phantom outline in FIGURE 13, is of a cross-section which is exactly the same as that of lancing punch 29, the working face of pressure pad 30 being parallel to the plane in which the blank is stamped from the parent sheet metal. Pressure pad 30 is a close, working fit in a female die opening, the cutting face of said female die being also parallel to the plane in which the blank is stamped from the parent sheet metal. The aforementioned die is not shown in the drawing because it is simply a female complement to lancing punch 29. To sever a scale contour from the parent sheet metal, lancing punch 29 travels upward on a plane which is perpendicular to the parent sheet metal, the initial entry occurring at the rearward extremity of the scale 27. Lancing punch 29 continues upward until the lowest point on the angular cutting face of lancing punch 29 reaches the level at which the initial entry occurred. During this interval of punch travel, the scale contour is completed and the scale 27 is disposed to the parent sheet metal at an angle which is equal to that of the cutting face of lancing punch 29. As lancing punch 29 recedes, pressure pad 30 returns the scale 27 to its original plane in the parent sheet metal. In FIGURE 12, the upper and middle scales 27 have been completed and the lower scale contour is shown to be approximately halfway through the previously described process which lances it from the parent sheet metal. As the lower scale contour continues in a forwardly direction to a point which is the aforementioned relatively short distance past the hereinbefore described infinitesimal junction created by the tangency of the semi-elliptical curves of the lower and middle scale contours, the scrap metal from the three scale contours is separated from the blank as a single piece. A portion of the scrap metal 31, FIGURE 12, is shown hypothetically broken to clarify the illustration.

The foregoing description, in which the scales 27 are lanced in an upward direction from the parent sheet metal, compels any stamping burrs to be on the unexposed side of the scales 27 and produces the very desirable effect, particularly at the infinitesimal junction, of a slightly rounded edge on the exposed side of the scales 27, due to the compression of the exposed side into the female die opening.

It is pertinent to note that the description relative to FIGURES 12 and 13 is the only process known to the inventor which will produce scales 27 of the described contour, size and disposition to each other. Those versed in the art will readily comprehend that any other procedure would necessitate a male notching punch and matching die, said notching punch including in its contour, at least one of the infinitely pointed spears which appear on the scrap metal 31, FIGURE 12. Such a notching punch would, of course be totally impracticable and any attempt to shorten the spear to a practicable contour would, considering that the longitudinal and transverse dimensions of the semi-elliptical curves are already only one-tenth of an inch, eliminate the infinitesimal junction and virtually destroy the hereinafter to be described object of the scales 27 and their relationship to each other.

The essence of the forming and assembly of my invention is described as follows:

The legs 26 of the blank, FIGURE 6, are bent downwards from the plane in which the blank is stamped from the parent sheet metal, approximately sixty-five degrees, the legs 26 remaining straight and a small bending radius occurring at their roots. The second bend of the blank, FIGURE 6, occurs sharply on the previously described hypothetical line 25—25, and disposes the forward area which contains the rectangular hole 20, downwards from the plane in which the blank is stamped from the parent sheet metal, approximately seventy-five degrees, the rearward area maintaining the original plane in which the blank was stamped from the parent sheet metal. Thus, the blank affects a claw-like profile and will be hereinafter referred to as transverse element 32.

The blank, FIGURE 7, is bent identically to the blank, FIGURE 6, and will be hereinafter referred to as transverse element 33.

The blank, FIGURE 8, is also bent identically to the blank, FIGURE 6, and will be hereinafter referred to as transverse element 34.

The remaining transverse elements are exact replicas of transverse elements 32, 33, and 34.

The most rearwardly pair of opposite tabs 24 on the blank, FIGURE 5, are bent downwards from the plane in which the blank is stamped from the parent sheet metal, approximately fifty degrees. The blank, FIGURE 5, is then formed into a shallow, longitudinal arc, the height of the arc being approximately one-tenth the length of the arc, the length of said arc equalling the length of the blank, FIGURE 5, and bent-down tabs 24 being on the inside of the arc. The blank, thus partially formed, will be hereinafter referred to as longitudinal mounting element 35.

With longitudinal mounting element 35 having the bent-down tabs 24 projecting on the underside, transverse element 32, with scales 27 uppermost and projecting rearwardly, is mounted on the forward end of longitudinal mounting element 35, by means of rectangular hole 20. Transverse element 32 is moved rearwardly on longitudinal mounting element 35 until the rearward progress of transverse element 32 is obstructed by the previously bent down, most rearwardly pair of opposite tabs 24. With transverse element 32 remaining adjacent to the bent-down tabs 24, the second most rearwardly pair of opposite tabs 24 are bent down identically to the most rearwardly pair of opposite, bent-down tabs 24. Transverse element 32, while still freely movable, is now confined, the longitudinal movement being limited to the longitudinal space between the first and second most rearwardly pairs of opposite bent-down tabs 24 and the elevatory and transverse movement being limited to the amount of clearance between rectangular hole 20 and longitudinal mounting element 35, said longitudinal space and said rectangular clearance being exaggerated on the drawing to further clarify the illustration.

Transverse element 33 with scales 27 uppermost and projecting rearwardly is next mounted on the forward end of longitudinal mounting element 35 with bent-down tabs 24 projecting on the underside, by means of rectangular hole 20. Transverse element 33 is moved rearwardly on longitudinal mounting element 35 until the rearward progress of transverse element 33 is obstructed by the second most rearwardly pair of opposite, bent-down tabs 24. With transverse element 33 remaining adjacent to the second most rearwardly pair of opposite, bent-down tabs 24, the third most rearwardly pair of opposite tabs 24 are bent down identically to the first and second most rearwardly pairs of opposite, bent-down tabs 24. Transverse element 33, while still freely movable, is now also confined, with the movement being limited to the extent previously described relative to transverse element 32.

The foregoing mounting process involving transverse elements 32 and 33 is continued with transverse elements of the following order: 34, 33, 34, 33, 34, 33, and concluded with transverse element 32. Thus the completed assembly comprises nine overlapping transverse elements 32, 33, 34, loosely confined on one longitudinal mounting element 35 by ten pairs of opposite, bent down tabs 24.

Figure 1:
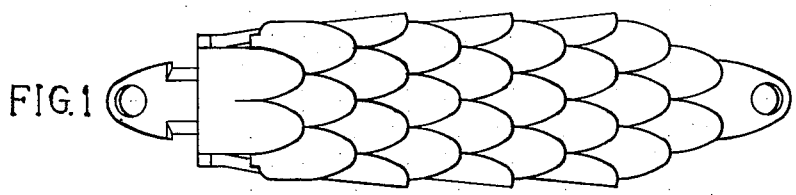
FIGURE 1 is a plan view thereof, with the forward part to the left and the rearward part to the right. The foregoing directions regarding the forward part and rearward part shall pertain to all the figures on the drawing, excepting FIGURES 4 and 10 which are cross-sections.

Because the longitudinal pitch of the mounted transverse elements 32, 33, 34 is equal to the longitudinal dimension of the semi-elliptical curves of the scales 27, and the previously described transverse disposition of scales 27, FIGURE 1 shows that the rearward extremity and longitudinal centreline of each scale 27 occurs directly over the infinitesimal junction of the two next rearwardly scales 27 or where the infinitesimal junction would conceivably occur, when there is only one relative next rearwardly scale 27.

The purpose of creating the infinitesimal junction of the scales' 27 curved contours by the process described in FIGURES 12 and 13 can now be fully comprehended. This process facilitates the presentation of an individual scale 27 which appears completely separate, is natural in size as illustrated at one-tenth of an inch, and retains through the overlapping precisely adjacent, completely severed visible contour, the vital qualities of integrity and realism. As shown in FIGURE 1, the effect created is the illusion of each scale growing out from under the two scales next forwardly and when the transverse elements 32, 33, 34 are alternately different colours, such as copper and silver, the accentuated illusion becomes realistically attractive.

Figure 2:
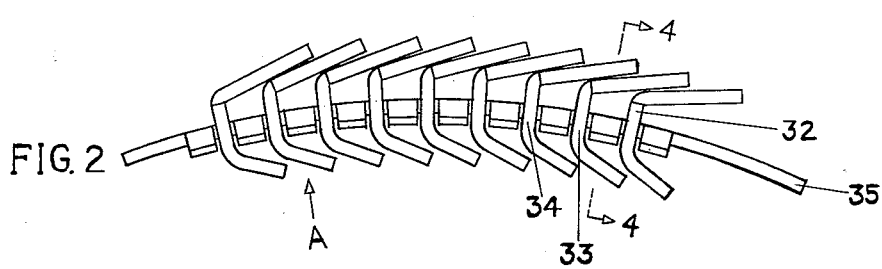
FIGURE 2 is a side elevation of FIGURE 1.
Figure 3:
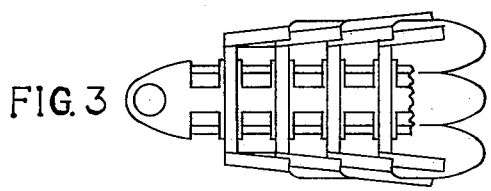
FIGURE 3 is a partial view of the underside of the lure in the direction of arrow A relative to FIGURE 2.
Figure 4:
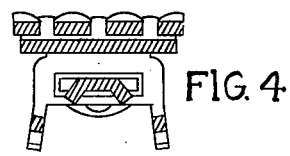
FIGURE 4 is a cross-section on the line 4—4 of FIGURE 2.

When drawn through the water by a fishing line attached by means of hole 21, the lure adopts a natural semi-revolving motion which causes each transverse element 32, 33, 34, to cut through the water in an arc which is transverse to the line of pull. Because of the loose confinement of transverse elements 32, 33, 34, each individual transverse element 32, 33, 34, is independently free to accept any animation prescribed by the previously described motion and the natural currents. The individual animation of the transverse elements 32, 33, 34, may be manifest as a swivel, simulating anatomical articulation, or as a pivot, creating the illusion of the opening and closing respiratory organs, or as a flutter of the scales 27 which is simultaneously transmitted to the individual pairs of overlapping legs 26 as a kick. The ideal mechanical extent of such animation is determined by the previously described clearances between transverse elements 32, 33, 34, and longitudinal mounting element 35, and as shown in FIGURE 2, is determined also by the angular disposition of the overlapping legs 26. Further, the independent animation of the individual transverse elements 32, 33, 34, continues uninterrupted regardless of the longitudinal pull on the lure as opposed to linked-chain devices wherein each element is controlled primarily by the adjoining front and rear elements, the elements becoming practically rigid under longitudinal pull.

As shown in FIGURES 1, 2, 3, and 4, the lure, when viewed from any direction, is instantly suggestive of some form of insect, reptilian or aquatic life, with that surface of the transverse elements 32, 33, 34 containing the rectangular hole 20, simulating the ribs, longitudinal mounting element 35 simulating the head, tail and dorsal configuration, the bentdown tabs 24 simulating the vertabrae of the creature and the scales 27 and legs 26 being self-explanatory, having been previously described.

As hereinbefore revealed, the invention is manufactured as a stamping and the low cost of producing such an attractive lure is readily apparent to those versed in the art, the fidelity of design permitting universal tooling which facilitates variation of size and contour with only minor adjustments to the existing tools. The weight distribution factor, of prime importance in fish lures, may be precisely adjusted to complement any size or contour by simply varying the thickness of parent sheet metal.

The foregoing specification further reveals the invention as an effective, durable fish lure with a multiplicity of surfaces creating innumerable reflective facets, and retaining the usually ephemeral qualities of organic suggestion and of mass without density, achieved through the art of fly-dressing with fur, feathers, et cetera.

Having thus described my invention, I claim:

1. In a fish lure, a plurality of scale elements including transverse leaves mounted substantially perpendicular to a longitudinal mounting element of substantially rectangular cross-section by means providing a substantially rectangular hole in said transverse leaves, each of said transverse leaves having a portion bent rearwardly to create an overlapping relation with an adjacent leaf and contoured to provide a transverse plurality of simulated individual scales and means for spacing and confining said transverse leaves.

2. In a fish lure, a plurality of scale elements including transverse leaves mounted substantially perpendicular to a longitudinal mounting element of substantially rectangular cross-section by means providing a substantially rectangular hole in said transverse leaves, each of said transverse leaves having a portion bent rearwardly to create an overlapping relation with an adjacent leaf and contoured to provide a transverse plurality of simulated individual scales, means for spacing and confining said transverse leaves and the lower portion of each of said transverse leaves providing two integral projections, rearwardly disposed, simulating legs.

3. In a fish lure, a plurality of scale elements including transverse leaves mounted substantially perpendicular to a longitudinal mounting element of substantially rectangular cross-section by means providing a substantially rectangular hole in said transverse leaves, each of said transverse leaves having a portion bent rearwardly to create an overlapping relation with an adjacent leaf and contoured to provide a transverse plurality of simulated individual scales and said longitudinal mounting element having integral projections between said transverse leaves, providing for independent spacing and confinement of said transverse leaves.

References Cited in the file of this patent

UNITED STATES PATENTS

| | | |
|---|---|---|
| 1,792,366 | Ettles | Feb. 10, 1931 |
| 1,897,529 | Palmer et al. | Feb. 14, 1933 |
| 2,123,150 | Larson et al. | July 5, 1938 |
| 2,665,515 | Frantello | Jan. 12, 1954 |